Nov. 3, 1953  A. DOUGLAS  2,657,881
JET PROPULSION AND BOUNDARY LAYER CONTROL MEANS
Filed Aug. 19, 1947
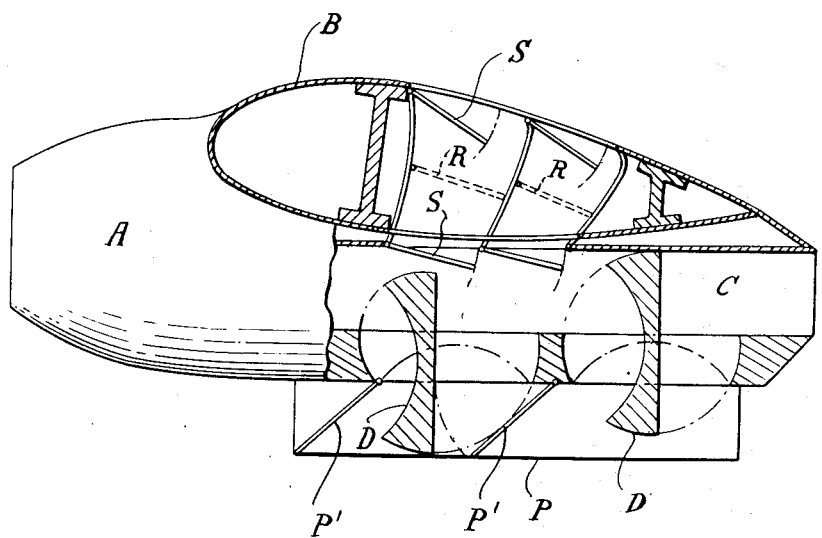
INVENTOR.
Aubrey Douglas
BY
Churchill, Rich, Weymouth & Engel
ATTORNEYS Patented Nov. 3, 1953

2,657,881

UNITED STATES PATENT OFFICE 2,657,881

JET PROPULSION AND BOUNDARY LAYER CONTROL MEANS

Aubrey Douglas, Saltford, Somerset, England

Application August 19, 1947, Serial No. 769,404
Claims priority, application Great Britain
April 17, 1947

4 Claims. (Cl. 244—40)

This invention relates to aircraft, and is particularly concerned with jet propelled aircraft and a method of and means for controlling the propulsive effort created by the efflux or jet. The present invention is a continuation-in-part of my co-pending application Serial No. 695,839, filed September 10, 1946, now issued as Patent No. 2,601,104.

According to the invention a method of controlling the reaction jet of a jet propelled or partially jet propelled aircraft consists in placing in communication the boundary layer of air at a lifting surface of an aircraft with the discharge gas stream of the propulsion unit.

The invention resides further in the control of the reaction jet of a jet propelled aircraft means whereby the boundary layer of air of the suction face of a wing surface is tapped and placed in communication with the jet blast tube by ducts opening to the said wing surface and to said blast tube, means being included for varying the inlet and outlet area of said ducts, whereby the thrust augmentation obtained may be controlled.

The auxiliary braking and lifting reactions to obtain thrust augmentation are preferably generated by adjustable diversion vanes and/or hinged flaps fitted at the inlet and/or outlet ends of the ducts which places the wing surface in communication with the blast tube.

In a preferred arrangement according to the invention as shown in the accompanying drawing, a jet propulsion unit A is mounted below and forward of the wing B which is provided with ducts controlled by hinged flaps S located at opposite ends thereof for tapping the boundary layer to obtain thrust augmentation through the ducts in the wing which communicate with the nozzle outlet or blast tube C. The flaps S are adjustable, whereby the thrust augmentation effect obtained may be controlled. The blast tube C may in addition be provided with rotatable diversion baffles D, the right hand one of which is shown in fully obturating position and the other one of which is shown in partially obturating position, both of said baffles when in horizontal position providing a free normal outlet for the gases through the blast tube C.

Non-return flaps R or equivalent means may be fitted to prevent beating back of the flame to the wing surface from the blast tube in case of blow back, for example. Hinged doors P and P' are provided to form a duct together with the member D in order to assist an exhaust of the gas clear of the lower surface of the wing of the aircraft.

Thrust augmentation, such as obtained, for example, by the arrangement illustrated results from the kinetic aspiration of an auxiliary airflow through the inclined intakes, thereby producing an injector effect and may be employed throughout any part of the length of any of the ductings and may be combined with any valve or valves or directionable ducting, the purpose being to increase the velocity of the effluent and/or localised heat reduction and/or for tapping the boundary layer to promote increase of lift. The thrust augmentor intakes may be varied in cross-sectional area or completely obturated, either by axial and/or rotary or other suitable movement of the ducting proper in which the thrust augmentor is incorporated or by any suitable valve means.

Boundary layer tapping is particularly effective when the propulsion unit is running at full speed and is most required when the aircraft is travelling at a comparatively slow speed, for example, at landing; a slow running aircraft and a fast running engine is thus made possible by the deflection of the jet stream.

What I claim and desire to secure by Letters Patent is:

1. Means for controlling the thrust augmentation of a propelling jet of a jet propelled aircraft, comprising a jet propulsion unit having an exhaust duct, an aircraft wing having openings in its lifting surfaces, ducts for placing said openings in communication with the exhaust duct of the propulsion unit for tapping the boundary layer of air from said wing surfaces, adjustable flaps controlling the openings in the wing surfaces and non-return flaps in the ducts through the wing adapted to prevent the entry into said passages of hot gases or flame from the exhaust duct of the propulsion unit under conditions of blow-back or delayed combustion.

2. In an aircraft having wings, a jet propulsion unit comprising a propelling jet having a blast tube, means in the exhaust duct of the blast tube for diverting and directionally controlling the flow of at least part of the combustion gases from the blast tube to cause said gases to move in a direction other than normally through the blast tube to effect a braking, a lifting and braking, or a lifting reaction on the aircraft, said wings having openings in their lifting surfaces and wing ducts for establishing communication between said openings and the exhaust duct of the blast tube whereby to effect boundary layer air tapping from the wing surface to the exhaust duct of the blast tube to augment the thrust of the jet.

3. An aircraft according to claim 2, wherein adjustable flap means are provided in the boundary layer air tapping wing openings.

4. An aircraft according to claim 2, wherein adjustable flap means are mounted at the juncture of the blast tube and the wing ducts for controlling the thrust augmentation of the air drawn through the boundary layer air tapping wing openings.

AUBREY DOUGLAS.

References Cited in the file of this patent

UNITED STATES PATENTS

| Number | Name | Date |
|---|---|---|
| 2,280,835 | Lysholm | Apr. 28, 1942 |
| 2,346,178 | Mercier | Apr. 11, 1944 |
| 2,383,385 | Heintze | Aug. 21, 1945 |
| 2,396,911 | Anxionnaz | Mar. 19, 1946 |
| 2,432,359 | Streid | Dec. 9, 1947 |
| 2,453,721 | Mercier | Nov. 16, 1948 |
| 2,455,458 | Whittle | Dec. 7, 1948 |
| 2,514,513 | Price | July 11, 1950 |
| 2,568,813 | Lundberg | Sept. 25, 1951 |

FOREIGN PATENTS

| Number | Country | Date |
|---|---|---|
| 390,363 | Great Britain | Apr. 6, 1933 |
| 512,064 | Great Britain | Aug. 29, 1939 |
| 568,667 | Great Britain | Apr. 16, 1945 |

OTHER REFERENCES

"Flight," Issue of December 19, 1946, page 675.